UNITED STATES PATENT OFFICE.

JOHN C. FLEMING, OF SUMMIT, NEW JERSEY.

TOILET CREAM.

SPECIFICATION forming part of Letters Patent No. 690,848, dated January 7, 1902.

Application filed December 13, 1900. Serial No. 39,604. (No specimens.)

*To all whom it may concern:*

Be it known that I, JOHN C. FLEMING, a citizen of the United States, residing at Summit, in the county of Union and State of New Jersey, have discovered a new and useful Process of Making Toilet Cream, of which the following is a full, clear, and accurate description.

The composition of matter which I produce by the process about to be described is a toilet article intended as a substitute for soap and useful for the same purposes; but inasmuch as it is especially designed for cleansing and purifying the skin it will be understood that the materials used in its composition should be selected with special reference to their purity and the process of manufacture carried out in such manner as to produce an article entirely free from all properties deleterious to the skin. The materials which are employed in my process are an oil, either vegetable or animal, potash obtained from wood-ashes with distilled water, whey, and a suitable perfume. I am aware that these and kindred materials have been used before in the manufacture of soap by processes in which the oil has been saponified by combination with a solution of alkali and the subsequent addition of whey; but in the practice of my new process of manufacture the improvement over the old processes and the advantages which I derive from the new method lie in the manner of bringing together the materials which enter into the composition of the soap and the superiority of the results thereof.

My process consists in dissolving an alkali with whey and then thoroughly and intimately mixing the solution thus produced with an animal or vegetable oil which has previously been somewhat heated. This dispenses with the necessity for the use of water or any other substance beyond the actual ingredients employed in the production of soap by my process, and in this way I produce a soap of a finer quality and better adapted for the uses for which it is designed. The oil which is to be used should be purified to free it from acids and impurities, the whey carefully prepared from sweet milk and freed from solids and foreign substances, and the potash after being obtained from a good quality of wood-ash by the use of distilled water should be carefully filtered and evaporated down to a solid. The ordinary and well-known processes for obtaining these ingredients may be followed, preferably preserving the precautions above noted, so that no further description of the details of the steps necessary in obtaining or preparing the materials required need be given.

In carrying into practice my process of making toilet cream the purified oil is placed in a steam or water jacketed vat and brought to a temperature not materially exceeding 120° Fahrenheit and to it potash, previously dissolved in whey, is then added and stirred in slowly. The proportion of potash is dependent upon the quantity and character of the oil, being determined experimentally or according to well-known formulæ, so that when the process of saponification is complete there will remain no excess of alkali in the compound. The quantity of whey used for dissolving the potash may be greater or less, according to the desired physical consistency of the resulting product, but usually should be approximately equal to the quantity of water which would be used for the alkaline solution employed for the purpose of making the ordinary soft soap. When by stirring under a moderate heat the solution of potash and whey has been taken up by the oil, the mixture is allowed to stand in a warm place for about forty-eight hours. It is then thoroughly stirred again in order to insure the complete chemical change resulting from the action of the alkali on the oil, so that there will remain no excess of either oil or alkali. The compound is then placed in a jacketed kettle, a small additional amount of whey added, and the whole brought to a boil in order to effect a complete chemical change and mixture of the ingredients, after which it is allowed to cool off. When the material is cooled, a perfume is incorporated therewith in the usual manner, and it is then put up in suitable packages for convenience of transportation and use.

From the above it will be seen that the special feature which distinguishes my process is the mingling together in the manner described of an animal or vegetable oil with a solution of whey and alkali.

What I therefore claim, and desire to secure by Letters Patent, is—

1. The process herein described which consists in heating an animal or vegetable oil to a temperature not materially to exceed 120° Fahrenheit, adding thereto a solution of potash and whey, and then, after the mixture has been allowed to stand until the process of saponification has taken place, boiling the same with an additional quantity of whey, as set forth.

2. The herein-described process of making toilet cream which consists in dissolving an alkali in whey and intimately mixing the solution with an animal or vegetable oil, as set forth.

3. The herein-described process of making a composition of matter suitable for use as a substitute for toilet soap by intimately mixing an animal or vegetable oil with a solution of whey and potash obtained from wood-ashes, as set forth.

JOHN C. FLEMING.

Witnesses:
M. LAWSON DYER,
BENJAMIN MILLER.